United States Patent [19]

Nakayama et al.

[11] Patent Number: 4,638,329
[45] Date of Patent: Jan. 20, 1987

[54] THERMAL RECORDING METHOD AND APPARATUS

[75] Inventors: Toshihiko Nakayama; Fujio Moriguchi; Tomio Murayama; Yasuhiro Takeo, all of Ebina, Japan

[73] Assignee: Fuji-Xerox Co. Ltd., Japan

[21] Appl. No.: 770,708

[22] Filed: Aug. 29, 1985

[30] Foreign Application Priority Data

Aug. 31, 1984 [JP] Japan ................................ 59-182934

[51] Int. Cl.⁴ ........................................... G01D 15/10
[52] U.S. Cl. ................................. 346/76 PH; 400/120
[58] Field of Search .................. 346/76 PH; 400/120; 219/216 PH

[56] References Cited

U.S. PATENT DOCUMENTS 4,360,819 11/1982 Saito et al. ..................... 346/76 PH
4,454,516 6/1984 Moriguchi et al. ............ 346/76 PH Primary Examiner—Arthur G. Evans
Attorney, Agent, or Firm—Handal & Morofsky

[57] ABSTRACT

A thermal recording method and apparatus for printing picture information with use of a thermal head, in which picture information corresponding to one unit to be printed is divided into a plurality of blocks using counters, etc., and the rate of black data contained in each of the divided blocks is detected to know the distribution of black data contained in the one unit, whereby printing is carried out with the minimum number of printing determined by the distribution of black data in the one unit.

12 Claims, 8 Drawing Figures

FIG.4
PRIOR ART
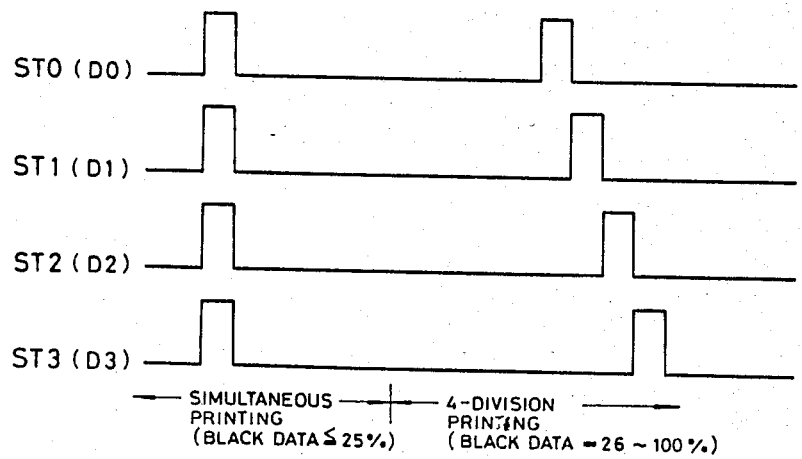
FIG.5
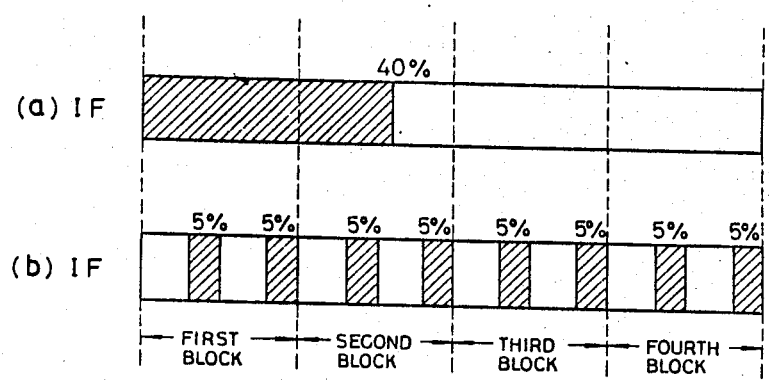
FIG.6
(a) CD
| BlK0 | BlK1 | BlK2 | BlK3 |
|------|------|------|------|
| 0 | 0 | 1 | 1 |
(b) CD
| BlK0 | BlK1 | BlK2 | BlK3 |
|------|------|------|------|
| 0 | 0 | 0 | 0 |

THERMAL RECORDING METHOD AND APPARATUS

BACKGROUND OF THE INVENTION

1. Field of the Invention

This invention relates to a thermal recording method and apparatus for use in a printing device such as such facsimile equipment or a digital copying machine and, more specifically, to an improvement in the method and apparatus for driving a plurality of heating elements of a thermal head simultaneously or dividedly according to the number of picture elements to be printed in one scanning line.

2. Description of the Prior Art

The heat-sensitive recording apparatus of the type referred to is conventionally arranged as shown, for example, in FIG. 3 to control the frequency of printing by the thermal head. More particularly, the system comprises a thermal head 10 having a plurality of heating elements corresponding to the number of picture elements in one scanning line, a paper feeding mechanism 20 including a motor driver 21 and a motor 22 for adjusting the feeding movement of papers (not shown) to be recorded by the thermal head 10, a pre-scaler 31 for detecting data to be printed, i.e., the so-called black data from picture information IF transmitted on the basis of a proper scale, a counter 32 for counting the number of the detected black data for each one scanning line of the picture information IF, a counter 40 for counting a clock signal CLK, and a ROM sequencer 51 which previously stores various sequence data concerning printing modes of the thermal head 10 and paper feeding modes of the paper feeding mechanism 20 based on the printing modes and which functions to receive addressing contents of the outputs of the counters 32 and 40 and sequentially send these data according to the addressing contents to the head 10 and mechanism 20 to control them. More concretely, the ROM sequencer 51, when addressed by the output of the counter 32 corresponding to upper 6 ones of 12 bits at its address terminals A6 to A11, designates the start address of a specific sequence to be selected depending on the proportion of black data to one scanning line data; whereas the sequencer 51, when addressed by the output of the counter 40 corresponding to lower 6 ones of the 12 bits at its address terminals A0 to A5, sequentially executes the selected sequence, whereby the number of printing times for one scanning line by the thermal head 10 is determined to provide a good efficiency according to the picture information contents. For this purpose, the thermal head 10 shown in FIG. 3 includes, in addition to the aforementioned heating elements, a shift register and a buffer memory for temporarily storing the transmitted picture information IF and a drive circuit for driving the heating elements on the basis of the stored information and the sequence data (strobe signals) applied from the sequencer 51.

In the aforementioned conventional thermal recording apparatus, if the allowable simultaneous printing of block data by the thermal head 10 is, for example, 25% or less of all the data of the picture information in one scanning line due to the temperature rise of the thermal head 10, the apparatus adopts two types of sequences, i.e., simultaneous printing and four-division printing to print the picture information of one scanning line, as shown in FIG. 4. In other words, if the count value of the counter 32 corresponding to one scanning line is less than 25% of the total number of picture data of the same line, then the strobe signals (indicative of sequence data D0 to D3) will be applied to strobe terminals ST0 to ST3 of the thermal head 10 simultaneously to designate the simultaneous printing mode. On the other hand, if the count value of the counter 32 is between 26 and 100% of the total picture data number, then the strobe signals will be applied to the strobe terminals ST0 to ST3 sequentially to designate the four-division printing mode.

Under the above conditions, when information data IF having the contents shown, for example, in FIG. 5 (a) is applied as the picture information of one scanning line, the thermal head 10 will be driven under control of the four-division printing sequence because the information IF contains 40% black data. When picture information IF having the contents shown in FIG. 5 (b) is applied as one scanning line picture information, the thermal head 10 will be similarly driven under control of the four-division printing sequence because the information IF contains 40% black data (shown as shadowed zones in FIG. 5) though such zones are dispersed.

Now attention will be directed to a picture information IF as shown in FIG. 5(b). When the thermal head 10 is driven under control of, for example, a two-division printing sequence, 20% black data of the information IF can be simultaneously printed. It will be noted that the printing speed of such a picture information IF by the two-division printing sequence can be higher than that by the four-division printing sequence. However, since the known apparatus cannot know the distribution of black data of the picture information IF, it is impossible to drive the thermal head with a good efficiency according to the contents or black data distribution of the picture information, which results in that the printing speed cannot be increased efficiently even though the apparatus previously detects the rate of black data in the information IF to determine a proper printing sequence for the thermal head.

SUMMARY OF THE INVENTION

It is a primary object of the present invention, therefore, to provide a thermal recording method and apparatus which can realize the efficient driving of a thermal head according to the contents of each picture information.

According to the present invention, this object can be attained by dividing picture information corresponding to one unit into a plurality of blocks and detecting the rate of black data for each of the divided blocks to determine a proper driving sequence for a thermal head. As a result, the rate of the black data contained in one unit picture information can be roughly judged, the distribution of the black data in that unit can be judged, and the thermal head can be driven more efficiently according to the contents of input picture information.

In one modification of the present invention, the rate of the black data contained in one unit is detected, and when the rate falls within the allowable simultaneous printing range of the thermal head the simultaneous printing sequence is adopted. Thus, the thermal head can be driven with a high efficiency, especially, when a small quantity of black data is distributed throughout the unit.

In this manner, according to the present invention, the contents of each input picture information can be accurately detected and the thermal head can be driven with a high efficiency according to the detected contents, whereby the printing speed of the thermal head can be remarkably increased.

BRIEF DESCRIPTION OF THE DRAWINGS

In the accompanying drawings;

FIG. 4 is a timing chart showing, as an example, the driving modes of a thermal head in the prior art apparatus shown information of that scanning line.

Figure 1:
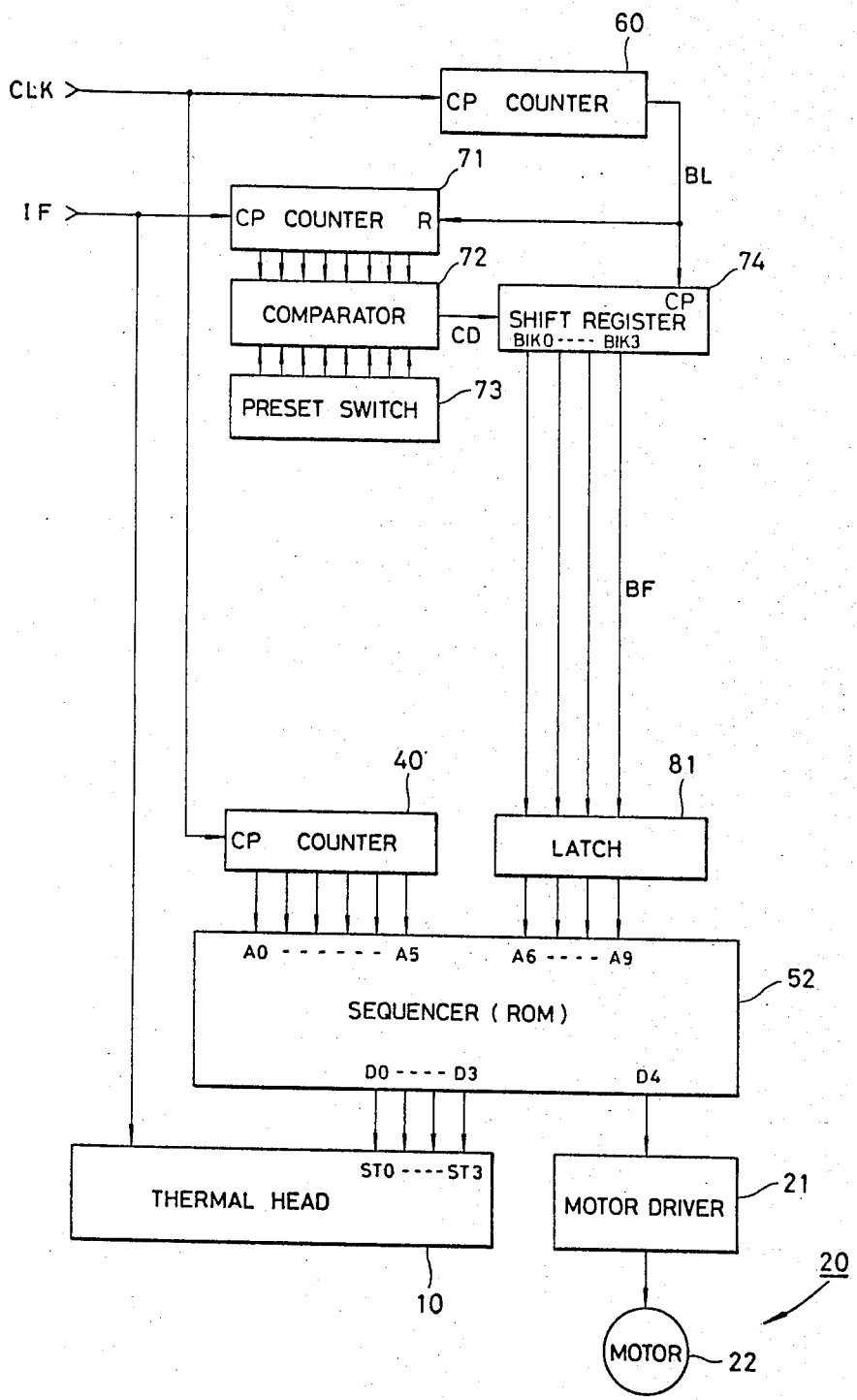
FIG. 1 is a block diagram showing the arrangement of an embodiment of a thermal recording apparatus in accordance with the present invention.
Figures 7, 8:
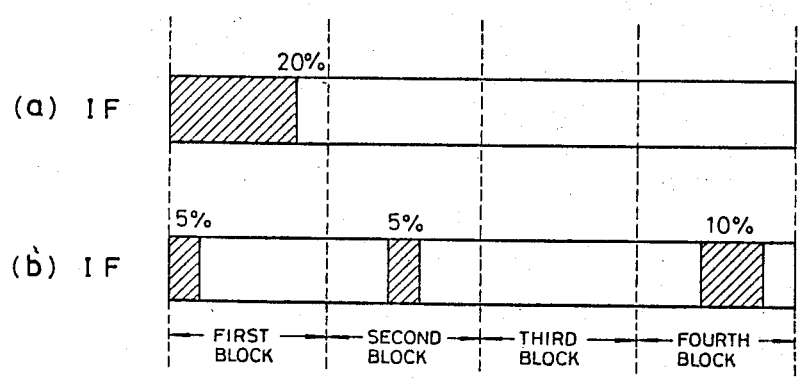

A counter 60 receives and counts a clock signal CLK. More particularly, after counting the number of clock pulses (on the assumption, in this embodiment that one picture data corresponds to one clock) corresponding to ¼ of the total number of data contained in the picture information of one scanning line, the counter 60 sends a signal BL having a logical level of, for example, "1" to a counter 71. The counter 71 counts the number of black data contained in the picture information IF and sends the counted value to a comparator 72 at proper timing. The counter 71 also clears the counted value whenever it receives the signal BL of logical level "1". That is, the operation of these counters 60 and 71 will cause division of the one scanning line picture information IF into four blocks and counting of the number of black data for each of the divided blocks. The comparator 72 compresses the counted value for black data counted by the counter 71 with a predetermined reference value preset by a switch 73. When the reference value is larger than the counted value, the comparator 71 sends a compare in FIG. 3;

FIGS. 5 and 7 are timing charts showing, in model form, examples of picture informations sent to the thermal recording apparatus and FIGS. 6 and 8 show states, in model form, of the different picture information contents of FIGS. 5 and 7 stored in a shift register as a constituent element of the apparatus.

DESCRIPTION OF THE PREFERRED EMBODIMENTS

Figure 3:
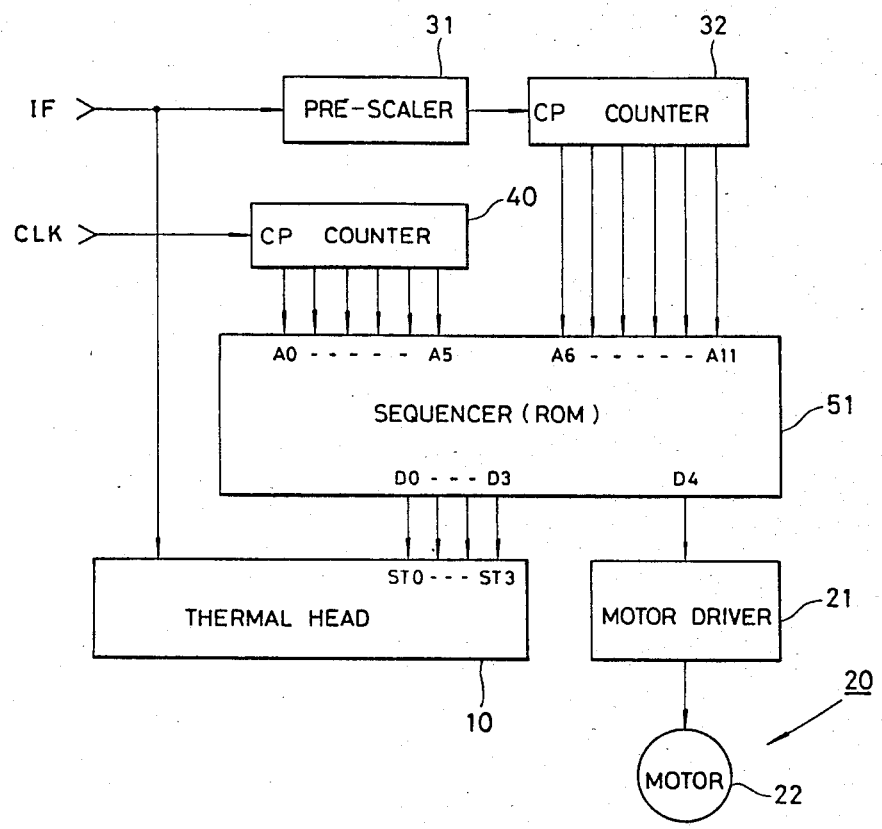
FIG. 3 is a block diagram showing the arrangement of a prior art thermal recording apparatus.

Referring to FIG. 1, there is shown an embodiment of a thermal recording system according to the present invention, in which the same constituent elements as those shown in FIG. 3 are denoted by the same reference numerals and explanation thereof is omitted.

In this embodiment, in view of the allowable simultaneous printing range (at most 25%) of the thermal head 10, the picture information IF of one scanning line is divided into four blocks and the rate of black data is detected for each of the divided blocks, whereby the optimum printing sequence for the thermal head 10 is selected according to the contents of the picture signal CD of logical level "0" to a shift register 74. On the other hand, when the reference value is less than or equal to the counted value, the comparator 71 sends the compare signal CD of logical level "1" to the shift register 74. The shift register 74, each time it receives the signal BL of "1" from the counter 60, that is, for each block, shifts the compare signal CD and stores it. That is, each time the apparatus of this embodiment receives the picture information corresponding to four blocks or one scanning line, the shift register 74 sequentially stores the contents of the compare signal CD at terminals BIK3 to BIK0 corresponding to the respective blocks. The stored contents are applied through a latch 81 to a sequencer 52 as a block information BF which roughly indicates, the rate of black data contained in that one scanning line and the distribution state of black data in the same line, to address the upper 4 bits of the sequencer 52. The sequencer 52, when thus addressed, designates the start address of the optimum printing sequence according to the contents of that one scanning line picture information, so that the sequencer, in response to sequential addressing caused by the clock counting of a counter 40, will cause the thermal head 10 to be driven under control of the designed printing sequence.

The operation of the thermal recording system according to the present invention will now be detailed.

Assume that 12.6% of the total data number for one scanning line is preset as the reference value for the comparator 72 by means of the preset switch 73. When a picture information IF in one scanning line shown in FIG. 5(a) is applied to the apparatus of FIG. 1 and is divided into four blocks by broken lines in FIG. 5 on the basis of the counted value of the counter 60 counting of the clock signal CLK, the compare signal CD generated by comparison between the counted value for black data counter by the counter 71 and the reference value (12.6%) will have logical levels of "1", "1", "0" and "0" for the first, second, third and fourth blocks, respectively. This is because the first, second, third and fourth blocks have 100, 60, 0 and 0% of black data respectively. Accordingly, the contents of the compare signal CD is shifted to right and stored in the shift register 74 according to the signal BL as mentioned above so that, when the picture information IF of that one scanning line has been all input, the shift register 74 will have upper bits BIK3 to BIK0 of "1", "1", "0" and "0" respectively. The stored contents (1,1,0,0) are applied as block information BF through latch 81 to the sequencer 52.

Since the allowable simultaneous printing range of the thermal head 10 is equal to or less than 25% of the total data number for one scanning line as already assumed, the contents (1,1,0,0) of the block information BF means that the first and second blocks have respectively at least 12.6% black data and thus these two blocks cannot be printed simultaneously; whereas, the third and fourth blocks have respectively less than 12.6% black data, that is, the total black data of these two blocks amounts to about 25% at most, sufficient allow for simultaneous printing. As a result, the sequencer 52 addressed by the block information BF will execute a three-stage or three-division printing sequence of (1) printing of the first block, (2) printing of the second block and (3) printing of the third and fourth blocks, according to the contents of the block information BF.

When such a picture information IF of one scanning line as shown in FIG. 5(b) is applied to the apparatus of FIG. 1 and is divided into four blocks as in FIG. 5(a), the first to fourth blocks have all the same 10% black data. Therefore, the compare signal CD generated by comparison between the counted value for the black data counted by the counter 71 and the reference value (12.6%) will have all the same logical level of "0" for the first to fourth blocks. Thus, when all the picture information IF of that one scanning line has been input, contents (0,0,0,0) as shown in FIG. 6(b) will be stored in the shift register 74 and be applied as the block information BF through the latch 81 to the sequencer 52.

The contents (0,0,0,0) of the block information BF means that any one of the first to fourth blocks contains less than 12.6% black data and thus at least two of the blocks can be printed simultaneously. In this case, the sequencer 52 addressed by the block information BF will execute a two-stage or two-division printing sequence of (1) printing of any two of the first to four blocks and (2) printing of the remaining two blocks.

Table 1 shows every possible cases between the contents of the block information BF and printing sequences to be executed by the sequence 52 in the system of FIG. 1.

TABLE 1

| Block Information BF | | | | |
|---|---|---|---|---|
| A6 | A7 | A8 | A9 | Printing Sequence |
| 0 | 0 | 0 | 0 | 2 - division printing |
| 0 | 0 | 0 | 1 | 3 - division printing |
| 0 | 0 | 1 | 0 | 3 - division printing |
| 0 | 0 | 1 | 1 | 3 - division printing |
| 0 | 1 | 0 | 0 | 3 - division printing |
| 0 | 1 | 0 | 1 | 3 - division printing |
| 0 | 1 | 1 | 0 | 3 - division printing |
| 0 | 1 | 1 | 1 | 4 - division printing |
| 1 | 0 | 0 | 0 | 3 - division printing |
| 1 | 0 | 0 | 1 | 3 - division printing |
| 1 | 0 | 1 | 0 | 3 - division printing |
| 1 | 0 | 1 | 1 | 4 - division printing |
| 1 | 1 | 0 | 0 | 3 - division printing |
| 1 | 1 | 0 | 1 | 4 - division printing |
| 1 | 1 | 1 | 0 | 4 - division printing |
| 1 | 1 | 1 | 1 | 4 - division printing |

In this way, according to the present invention, the distribution and rate of black data contained in the input picture information IF can be accurately judged according to the contents of the block information BF, and the picture information IF can be quickly printed under control of a printing sequence most suitable for the thermal head used.

Although the picture information for one scanning line has been divided into four blocks in the foregoing embodiment, the number of divided blocks may be increased to detect more accurately the contents (the distribution and rate of black data) of the same picture information, allowing more efficient printing sequence programming.

Figure 2:
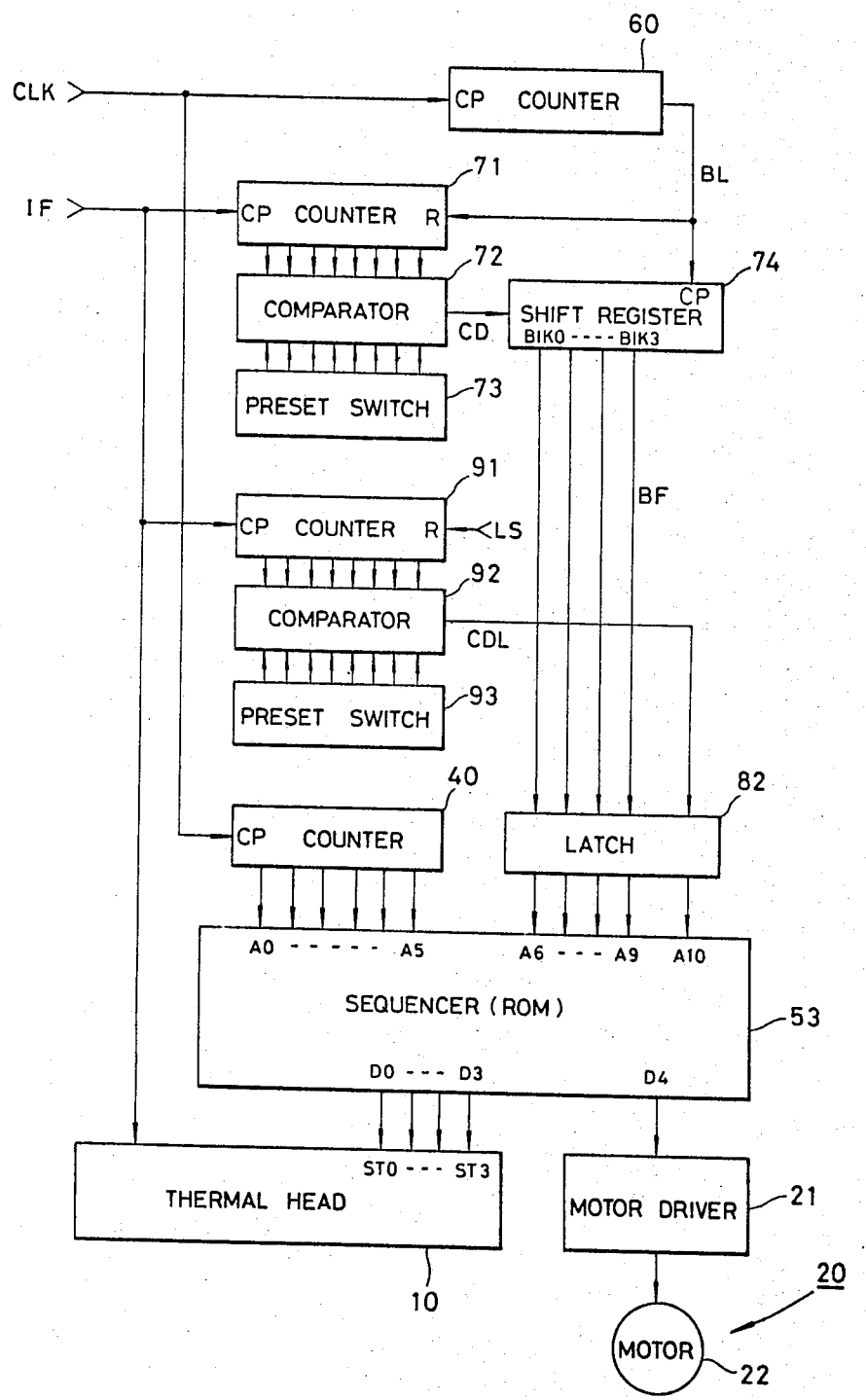
FIG. 2 is a block diagram of another embodiment of the present invention.

FIG. 2 shows another embodiment of the thermal recording apparatus according to the present invention, in which the same constituent elements as those in FIG. 1 or 3 are denoted by the same reference numerals and explanation thereof is omitted.

In the present embodiment, in addition to the function of the apparatus of FIG. 1, the rate of all black data contained in the picture information IF corresponding to one scanning line can be detected and when the detected black data rate falls within the allowable simultaneous printing range of the thermal head 10, the thermal head 10 can be driven under control of the simultaneous printing sequence by priority regardless of the contents of the block information BF.

More particularly, in this apparatus of FIG. 2, a counter 91, like the counter 71, counts the number of black data contained in the picture information IF and sends the counted value to comparator 92 at proper timing. However, the counter 91 clears its counted value when receiving a signal LS indicative of the start or end of one scanning line picture information IF, whereby the total number of black data corresponding to one scanning line can be detected. The comparator 92 compares the number of black data counted by the counter 91 with a reference value preset by a switch 93, that is, with the maximum black data number capable of being simultaneously printed by the thermal head 10 in this embodiment. When the reference value is greater than or equal to the number of the black data counted by the counter 91, the comparator 92 will send a compare signal CDL of logical level "0" to a latch 82, while, when the reference value is less than the number of the black data, the comparator 92 will output the compare signal CDL of logical level "1". The output compare signal CDL is latched together with the block information BF in the latch 82 to be applied to a sequencer 53 at its address terminal A10 corresponding to the highest bit. The sequencer 53 drives the thermal head 10 according to the contents of the compare signal CDL applied to the terminal A10. That is, when the compare signal CDL has a logical level of "0", the sequencer 53 will cause the thermal head 10 to be driven under control of the simultaneous printing sequence; while, when the signal CDL has a logical level of "1", the sequencer 53 will cause the head 10 to be driven under control of the suitable division printing sequence determined by the contents of the block information BF as in the embodiment shown in FIG. 1.

The operation of the apparatus of FIG. 2 according to the present invention will now be explained in detail.

Assume that 25% of the total data number for one scanning line is preset by the switch 93 as the foregoing reference value of the comparator 92.

When a picture information IF of one scanning line as shown in FIG. 7(a) is applied to the apparatus of FIG. 2 and is divided into four blocks as mentioned above, the counter 71 counts the number of 20, 0, 0 and 0% black data for the first, second, third and fourth blocks, respectively. Further, since the total number of black data contained in that one scanning line counted by the counter 91 corresponds to 20%, the compare signal CD to be stored in the shift register 74 has contents of "1", "0", "0" and "0" at its terminals BIK3, BIK2, BIK1 and BIK0 respectively as shown in FIG. 8(a). On the other hands, the compare signal CDL has contents of "0" as shown in FIG. 8(a). Therefore, in this case, the sequencer 53 will cause the thermal head 10 to be driven under control of the simultaneous printing sequence.

When a picture information IF as shown in FIG. 7(b) is applied to the apparatus of FIG. 2 and is divided into four blocks as mentioned above, the counter 71 counts the number of 5, 5, 0 and 10% black data for the first, second, third and fourth blocks, respectively, and the total number of black data contained in that one scanning line counted by the counter 91 corresponds to 20%. Accordingly, the compare signal CD to be stored in the shift register 74 has contents of "0", "0", "0" and "0" at its terminals BIK3, BIK2, BIK1 and BIK0, respectively as shown in FIG. 8(b), and the compare signal CDL has contents of "0" as shown in FIG. 8(b). In this case, the sequencer 53 will also cause the thermal head 10 to be driven under control of the simultaneous printing sequence.

Table 2 shows all possible relationships between the contents (at the terminals A6 to A9) of the block information BF, the contents (at the terminal A10) of the compare signal CDL, and the printing sequences to be executed by the sequencer 53.

TABLE 2

| Block Information BF | | | | |
|---|---|---|---|---|
| A6 | A7 | A8 | A9 | Printing Sequences |
| 0 | 0 | 0 | 0 | 2-division printing (simultaneous printing when A10 = "0") |
| 0 | 0 | 0 | 1 | 3-division printing (simultaneous printing when A10 = "0") |
| 0 | 0 | 1 | 0 | 3-division printing (simultaneous printing when A10 = "0") |
| 0 | 0 | 1 | 1 | 3-division printing |
| 0 | 1 | 0 | 0 | 3-division printing (simultaneous printinq when A10 = "0") |
| 0 | 1 | 0 | 1 | 3-division printing |
| 0 | 1 | 1 | 0 | 3-division printing |
| 0 | 1 | 1 | 1 | 4-division printing |
| 1 | 0 | 0 | 0 | 3-division printing (simultaneous printing when A10 = "0") |
| 1 | 0 | 0 | 1 | 3-division printing |
| 1 | 0 | 1 | 0 | 3-division printing |
| 1 | 0 | 1 | 1 | 4-division printing |
| 1 | 1 | 0 | 0 | 3-division printing |
| 1 | 1 | 0 | 1 | 4-division prirting |
| 1 | 1 | 1 | 0 | 4-division printing |
| 1 | 1 | 1 | 1 | 4-division printing |

In this way, according to the embodiment shown in FIG. 2, the thermal head can be driven more efficiently than the embodiment shown in FIG. 1. It goes without saying that, in the present embodiment, the increased number of divided blocks enables accurater detection of the contents of the input picture information, allowing more efficient printing sequences.

In the foregoing embodiment, the picture information for one scanning line is discussed. However, the present invention is applied more generally to the picture information for one unit. This unit is determined according to the structure of the thermal head used.

What is claimed is:

1. In a thermal recording method for printing picture information for one unit by a multi-element thermal head simultaneously or with a plurality of times, in which the number of printing operations for one unit made by said thermal head is determined by the ratio of black data and white data to be printed contained in the picture information for one unit, the improvement comprising that said picture information for one unit is divided into a plurality of blocks, the number of black data points in each block is counted and compared to a standard to generate an over the standard or under the standard signal for each of the blocks and said number of printing operations is determined by the signals associated with each of said divided blocks.

2. A thermal recording apparatus comprising a thermal head having a plurality of heating elements corresponding in number to picture elements contained in one unit of picture information and wherein the number of printing operations executed by said thermal head with respect to said picture information for said one unit is determined by the ratio of black to white data to be printed contained in said picture information, said apparatus comprising:
   dividing means for dividing said picture information for one unit into a plurality of blocks;
   counting means for counting the number of data to be printed for each of said divided blocks;
   comparing means for comparing said counted number of data to be printed with a preset reference value and generating a comparison result;
   storing means for temporarily storing each of said results for each respective block; and
   determination means for determining the number of printing operations executed by the thermal head in response to said temporarily stored results.

3. The thermal recording apparatus as set forth in claim 2, wherein said reference value is associated with said number of data to be printed contained in one raster to determine whether the total amount of data to be printed in said raster is sufficiently small or to determine (even) when said amount is large, is scattered in said respective blocks.

4. A thermal recording apparatus including a thermal head having a plurality of heating elements corresponding in number to picture elements of information contained in one unit of picture information and wherein the number of printing operation executed by said thermal head with respect to said picture information for said one unit is determined by the ratio of black data to white data to be printed contained in said picture information, said apparatus comprising:
   dividing means for dividing said picture information for one unit into a plurality of blocks;
   first counting means for counting the number of data to be printed for each of said divided blocks;
   first comparing means for comparing a preset first reference value with said number of data to be printed counted by said first counting means;
   storing means for temporarily storing said compared results for each of the blocks;
   second counting means for counting the number of data to be printed contained in said one unit;
   second comparing means for comparing said number counted by said second counting means with a preset second reference value; and
   means for determining said number of printing operations executed by the thermal head on the basis of a combination of said compared results temporarily stored in said storing means, in which, when said number counted by said second counting means is equal to or less than said second reference value, the number of printing operations executed by said thermal head is one.

5. The thermal recording apparatus as set forth in claim 4, wherein said first reference value is related to said number of data to be printed contained one unit and determined such that whether the rate of data to be printed in said one unit is sufficiently small, or even when large, said data are properly distributed in said respective blocks, can be judged, and wherein said second reference value corresponds to the maximum number of data capable of being simultaneously printed by the thermal head.

6. The method of claim 1, wherein said standard corresponds to half the maximum number of thermal head elements which may be driven simultaneously.

7. The thermal recording apparatus as set forth in claim 3 wherein said dividing means is a counter responsive to clock pulses associated with said data, said counter producing a block ending signal in response to counting a number of elements associated with a block.

8. The thermal recording apparatus according to claim 7 wherein said counting means compares its output to said reference value in response to an output from said dividing means.

9. The thermal recording apparatus according to claim 8 wherein said determination means is responsive to the output of said storing means and said clock pulses to cause said thermal head to be actuated.

10. The thermal recording apparatus of claim 9 further comprising second counting means for counting the number of data to be printed and contained in said one unit and second comparing means for comparing said number counted by said second counting means with a preset second reference value and wherein said determination means determines said number of printing operations executed by the thermal head on the basis of a combination of said compared results temporarily stored in said storing means, in which, when said number counted by said second counting means is equal to or less than said second reference value, the number of printing operations executed by said thermal head is one.

11. The thermal recording apparatus according to claim 2 wherein said preset reference value is equal to the maximum number of picture elements which may be driven at one time divided by the number of blocks which it may be desired to be driven simultaneously.

12. The apparatus according to claim 11 wherein the number of blocks which one desires to drive simultaneously is two and the preset reference value corresponds to half the number of heating elements of the thermal head which may be driven simultaneously.

* * * * *